United States Patent
Gerhardt et al.

(10) Patent No.: US 6,298,956 B1
(45) Date of Patent: Oct. 9, 2001

(54) BRAKE LINING FOR A PARTIAL LINING DISK BRAKE

(75) Inventors: Winfried Gerhardt; Hans-Dieter Leidecker, both of Frankfurt; Manfred Reuter, Weilmünster; Klaus Bernhard, Hochheim, all of (DE)

(73) Assignee: Continental Teves AG & Co., oHG, Frankfurt (DE)

( * ) Notice: Subject to any disclaimer, the term of this patent is extended or adjusted under 35 U.S.C. 154(b) by 0 days.

(21) Appl. No.: 09/355,162

(22) PCT Filed: Jan. 20, 1998

(86) PCT No.: PCT/EP98/00285

§ 371 Date: Nov. 1, 1999

§ 102(e) Date: Nov. 1, 1999

(87) PCT Pub. No.: WO98/32988

PCT Pub. Date: Jul. 30, 1998

(30) Foreign Application Priority Data

Jan. 24, 1997 (DE) .............................. 197 02 401

(51) Int. Cl.[7] .................. F16D 65/097; F16D 69/00; F16D 69/04
(52) U.S. Cl. ..................... 188/73.37; 188/73.36; 188/73.35
(58) Field of Search ............... 188/73.35, 73.36, 188/73.37, 250 E, 250 B, 250 G, 250 F; 192/70.19, 70.28

(56) References Cited

U.S. PATENT DOCUMENTS

| 4,155,430 | 5/1979 | Kawamura . |
| 4,995,482 | 2/1991 | Kobayashi et al. . |

FOREIGN PATENT DOCUMENTS

| 20 58 045 | 7/1971 | (DE) . |
| 34 02 866 | 9/1984 | (DE) . |
| 41 42 196 | 4/1993 | (DE) . |
| 01 38 081 | 4/1985 | (EP) . |
| 6-129451 | 10/1994 | (JP) . |

Primary Examiner—Robert J. Oberleitner
Assistant Examiner—Melody M Burch
(74) Attorney, Agent, or Firm—Rader, Fishman & Grauer PLLC

(57) ABSTRACT

The present invention discloses a brake lining which, in order to reduce and eliminate noises, has a sliding metal sheet in addition to the classical lining parts such as friction lining, lining support plate and damping plate. Further, the damping plate has bores which are filled with grease. The purpose of the grease is, primarily, to lubricate the surface directed to the sliding metal sheet and the damping plate so that both surfaces can slide on each other without friction.

4 Claims, 1 Drawing Sheet

BRAKE LINING FOR A PARTIAL LINING DISK BRAKE

The present invention relates to a brake lining for a spot-type disc brake which is provided with additional components to reduce and eliminate noises caused during braking.

In brake technology of spot-type disc brakes for automotive vehicles, brake linings are known which, beside the classical parts such as lining support member and friction lining, comprise additional components to prevent, reduce and eliminate noises which develop during braking in the caliper due to occurring vibrations, tensions and friction. A thin damping plate which is made of plastics or a metal coated with caoutchouc is applied to the back side of the lining support member. A first objective of the plastic plate is to absorb the vibrations provoked on the brake lining during braking and, thus, to prevent their propagation to the brake caliper and any resultant noises. A second objective is to attenuate noises which are produced by friction due to a relative movement between the brake lining and its abutment surfaces. The extensions of the brake lining shown in the art satisfy only in part the desired requirements of complete noise elimination.

Therefore, an object of the present invention includes designing a brake lining so that full noise elimination is ensured.

According to the present invention, this object is achieved by the characterizing part of claim 1. Fitted to the back side of the lining support plate is a thin damping plate made of plastic material with bores which serve as grease-receiving pockets. The grease out of the pockets spreads over the damping plate and is covered with a sliding metal sheet. Noises which are produced by vibrations of the lining support plate are uncoupled by the grease from the structure of the brake caliper and thereby dampened directly and eliminated, and not transmitted via the lining abutment surfaces to the structure of the brake caliper on which they produce noises. Noises which are caused by friction and produced due to the relative movement between the damping plate and the lining abutment surfaces of the brake caliper are dampened by way of the sliding metal sheet and the grease between the sliding metal sheet and the damping plate. The rotational relative movements which occur in the moment of braking are shifted from the abutment surfaces of the brake caliper and the lining support member into the plane between the damping plate and the sliding metal sheet. The outside of the sliding metal sheet adheres to the end surface of the brake piston due to the frictional force, and the damping plate slides on the back side of the sliding metal sheet. The friction is greatly reduced or eliminated in full due to the grease which is spread out of the grease pockets inbetween the sliding metal sheet and the damping plate so that vibrations or noises are not produced by friction between the sliding metal sheet and the damping plate.

An embodiment of the present invention will be explained in detail hereinbelow, making reference to the accompanying drawing.

Figure 1:
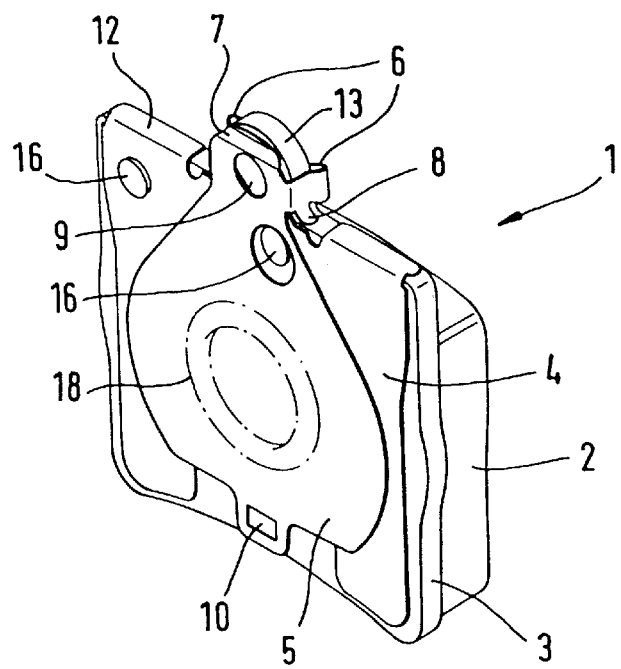
FIG. 1 is a view of a brake lining for a spot-type disc brake, completely assembled, including damping plate and sliding metal sheet.

The embodiment of FIG. 1 exhibits the completely assembled brake lining 1 comprised of friction lining 2, lining support member 3, damping plate 4, and sliding metal sheet 5. The damping plate 4 is cemented to the back side of the lining support member 3 and additionally fixed in its position by two rivets 16. At the top end of the damping plate 4, two preformed 90-degree angles 12 are integrated which bear against the shoulder 17 of the lining support member 3 and, thus, support the damping plate 4 downwardly in the Z direction. At the top end of the sliding metal sheet 5, two clips 6 which each have a resilient lip 8 at the bottom edge are fitted for attachment to the attachment lug 13 of the lining 1. The clips 6 prevent detachment of the sliding metal sheet 5 in the X direction and permit an assembly by slipping on in the Z direction downwardly. In the assembly, the resilient lips 8 move into abutment on the shoulder 14 of the attachment lug 13 and act as a stop for the proper installation position. At its bottom end, the sliding metal sheet 5 is provided with a punched-through projection 10 which is supported in the Z direction upwardly on the damping plate 4 and, thus, prevents detachment of the sliding metal sheet 5 in the Z direction.

Figure 2:
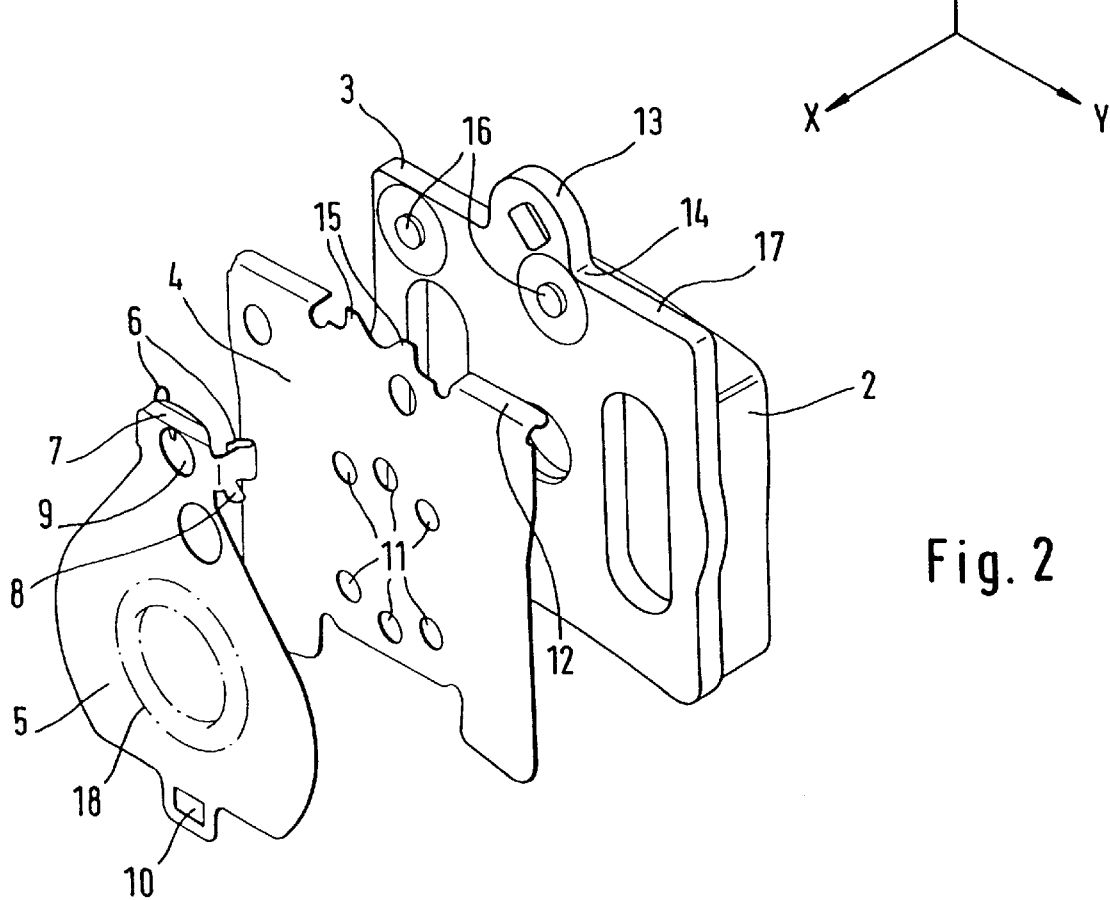
FIG. 2 is an exploded view of the brake lining for a spot-type disc brake including damping plate and sliding metal sheet.

FIG. 2 illustrates an exploded view of the individual parts of the brake lining 1, the lining support member 3 with friction lining 2, the damping plate 4, and the sliding metal sheet 5. The damping plate 4 includes two noses 15 at the top end of its abutment surface with the shoulder of the lining attachment lug 13. A depression 7 is indented into the sliding metal sheet 5 above the clips 6 on its abutment surface directed to the attachment lug 13. The depression 7 which urges the sliding metal sheet 5 away from the lining support member 3, along with the clips 6 that draw the sliding metal sheet to the lining support member, produces a moment around the noses 15 of the damping plate that act as fulcrum points, which moment presses the sliding metal sheet 5 against the damping plate 4 and thus covers and closes the grease pockets 11.

As an alternative of the grease pockets 11 machined into the damping plate, grease pockets 18 may be used which are configured as depressions and are integrated in the sliding metal sheet 5. As shown in the embodiment of FIG. 2, the grease pockets 18 may be configured as a circular depression or, depending on the shape and space on the sliding metal sheet, e.g. as circle segments, triangles, or in other shapes.

The moment directed to the brake lining 1 during braking is compensated by a relative movement between the sliding metal sheet 5 and the damping plate 4, with the result that tensions due to friction or torsions in the caliper or in the lining are prevented and, thus, noises are not produced. The moment introduced on the friction lining 2 is transmitted via the lining support member 3 to the damping plate 4. The sliding metal sheet 5 is maintained in its position on the abutment surface on the frontal end of the brake piston by friction. The grease in the grease pockets 11 of the damping plate is spread over the contact surface between the sliding metal sheet 5 and the damping plate 4. This ensures an almost frictionless sliding of the two components on each other and prevents that noise develops due to friction. When the brake lining 1 is devoid of moments again after the braking operation, the sliding metal sheet 5 is reset to its initial position by the resilient moment of the resilient lips 8 which press against the shoulders 14 of the attachment lug 13.

What is claimed is:
1. A brake lining, comprising:
   a friction lining attached to a lining support member,
   a damping plate which includes grease pockets containing grease, and
   a sliding metal sheet covering said grease pockets, wherein the sliding metal sheet has a detachment- prevention arrangement with respect to an actuating direction of the brake lining in the form of two clips which backgrip an attachment lug of the lining support member, and in that a punched-through projection is positioned at the bottom end of the sliding metal sheet as a detachment-prevention arrangement of the sliding metal sheet vertically to the actuating direction, wherein the damping plate has two nose-shaped extensions which bear against the attachment lug of the lining support member.

2. A brake lining as claimed in claim 1, wherein the sliding metal sheet at its top edge above the attachment lug for a retaining pin has a depression which is urged against the lining support member.

3. A brake lining as claimed in claim 1, wherein the sliding metal sheet is provided with an anti-rotation mechanism in the form of resilient lips on the bottom side of the clips of the detachment-prevention arrangement.

4. A brake lining as claimed in claim 1, wherein the sliding metal sheet is provided with grease-receiving pockets.

* * * * *